Nov. 9, 1937.  B. A. LINCOLN  2,098,584
INTERCHANGEABLE TEETH
Filed Dec. 18, 1934
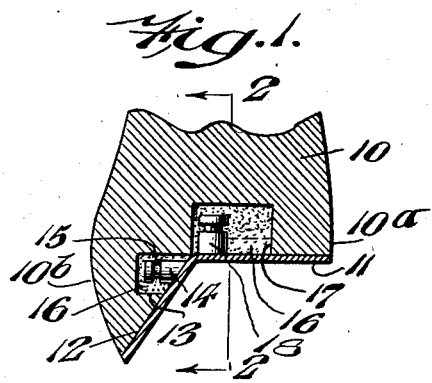
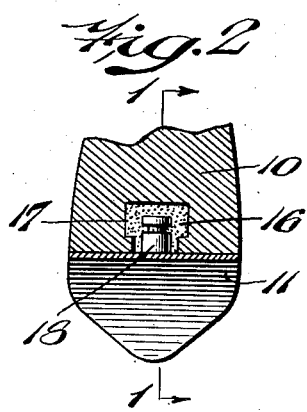
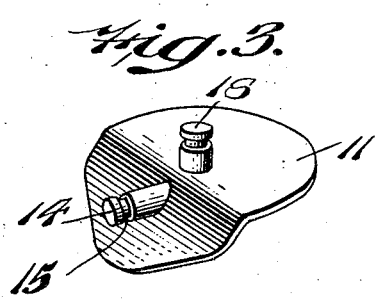
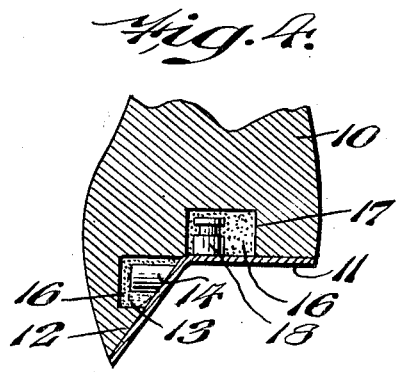
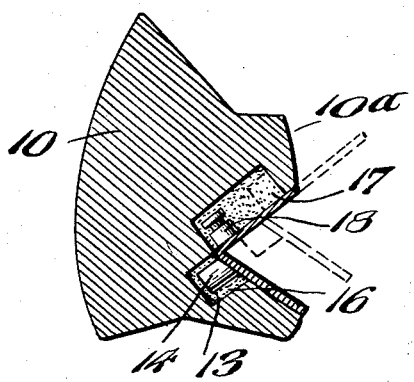
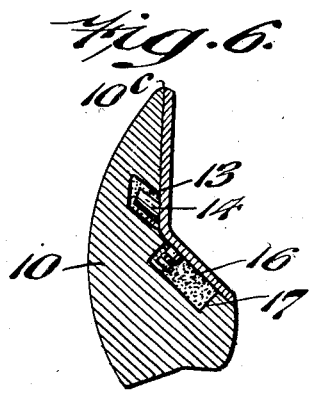
INVENTOR
BENJAMIN A. LINCOLN.
BY
ATTORNEY Patented Nov. 9, 1937

2,098,584

UNITED STATES PATENT OFFICE 2,098,584

INTERCHANGEABLE TEETH

Benjamin A. Lincoln, Philadelphia, Pa., assignor to Universal Dental Company, Philadelphia, Pa., a corporation of Pennsylvania Application December 18, 1934, Serial No. 757,987

6 Claims. (Cl. 32—9)

This invention relates to artificial teeth and, more particularly, to teeth in which the tooth facing or body is interchangeably connected to a backing or retaining member.

Principal faults of interchangeable teeth heretofore in use are that either the facings are not sufficiently strong to withstand unusual stresses imposed upon them in use, usually breaking at the point of connection between the facing and the backing, or, when sufficiently strong to withstand such stresses, frequently are not suitable for use in more than a limited number of mouth types.

A primary object of my invention is to provide a tooth facing of greater strength than those heretofore known while, at the same time, retaining its adaptability for use in a diversity of mouth types.

Another object of my invention is to provide an interchangeable tooth in which the line of jointure between the backing and facing is minimized where the tongue impinges against the lingual side of the tooth.

Yet another object of my invention is to provide a tooth facing that may be readily joined to and separated from a backing.

A further object of my invention is to provide an interchangeable tooth in which the backing is angular in cross-section and fits a similarly angled facing and in which a pinhole extends into the facing with its longitudinal axis in a plane parallel to one plane of the facing, together with means on the other plane of the facing and on the backing for connecting the two.

Other objects and advantages of my invention will be apparent from the following description, claims, and from the drawing, illustrating the preferred embodiments of my invention, in which:

Fig. 1 is a bucco-lingual vertical section on the line 1—1 of Fig. 2 illustrating a backing and facing embodying one form of my invention;

Fig. 2 is a mesio-distal vertical section taken on the line 2—2 of Fig. 1;

Fig. 3 is a perspective view of the backing shown in section in Figs. 1 and 2;

Fig. 4 is a bucco-lingual vertical section illustrating a slightly modified form of backing embodied in my invention;

Fig. 5 is a bucco-lingual vertical section of a modified form of my invention; and Fig. 6 is a bucco-lingual vertical section of my invention as embodied in an anterior tooth.

Referring to the drawing, 10 indicates an interchangeable facing, in Figs. 1, 2, 4 and 5 an upper posterior, and in Fig. 6 a lower anterior. Obviously, by turning the drawing upside down the first group of figures may represent a lower posterior and Fig. 6 an upper anterior. These facings may be of any material suitable for the purpose, preferably a ceramic such as porcelain, but are homogeneous in nature and are to be distinguished from facings of a composite character in which a metallic shape is baked into the ceramic.

The facing 10 is formed with, or may have cut into it a recess 12. This recess is characterized by being formed of two intersecting plane surfaces of which the gingival terminates at the lingual wall 10$^a$ of the tooth. The other surface may terminate, depending upon the type of tooth needed or desired at the buccal wall 10$^b$ (Figs. 1, 2 and 4); also at the lingual wall 10$^a$ (Fig. 5); or at the incisal edge 10$^c$ (Fig. 6). It is to be noted that wherever positioned, the recess is always angular in vertical cross-section.

A backing 11 is shaped to engage the recess 12 and to fit closely against the two surfaces thereof as indicated most clearly in Figs. 1 and 4 to 6. Thus the stresses exerted upon the facing and backing pass from one to the other not through merely a line in a single vertical section but through what amounts to a complete cross-section of the tooth.

In order to maintain the backing in position against the facing without decreasing the strength obtained by reason of the type of connection just described, I provide in the facing 10 a pinhole 13, preferably circular in cross-section. The hole 13 preferably may be positioned with its longitudinal axis parallel to one of the surfaces of the recess 12 and is adapted to receive a pin 14. The pin 14 may (as in Figs. 1 and 3) or may not (as in Figs. 4, 5 and 6) be formed with a groove 15 thereon, or it may be otherwise roughened to provide a firm base for cement 16, but, however fashioned, it is irremovably positioned with respect to the backing 11. Preferably, as illustrated, the pinhole 13 and pin 14 are positioned on the bucco-lingual axis of the tooth and approximate each other in size so that a minimum of cement is necessary.

The other face of the backing 11 carries a pin 18 fixed thereto which engages a slot 17 formed in the corresponding surface of the recess 12. The slot 17 is preferably T-shaped in cross-section with the base of the T as wide at least as the diameter of the pin 18 and is as long as the pin 14 plus the diameter of the pin 18. Thus, the backing being positioned in the patient's mouth, the facing is mounted (see Fig. 5) by positioning the slot 17 over the pin 18 and sliding the facing from the position indicated in dotted lines to the position indicated in full lines, i. e., until the pin 14 enters the hole 13 and the backing and facing come into close contact.

As indicated in Fig. 3, the backing 11 is, in plan, approximately semi-circular at the most lingual portion thereof. By means of this shape roughness, which cannot be eliminated because of the dissimilar nature of the materials, is minimized at the point where the tongue impinges against the teeth to a point where it does not annoy the user.

It is to be understood that the angles and positions of the parts shown are illustrative only, and that various modifications may be made in the embodiments of my invention as above described without departing from the spirit and scope thereof as set forth in the following claims.

I claim as my invention:

1. An interchangeable artificial posterior tooth comprising an all-ceramic body having therein a recess with two angularly disposed, meeting sides, each having a plane surface, both of said sides terminating at the lingual wall of said body, a pinhole extending inwardly into said body from one of the sides of said recess with its axis parallel to the other of said sides and a slot extending into said body solely from said other side.

2. An interchangeable artificial posterior tooth comprising an all-ceramic body having therein a recess with two angularly disposed, meeting sides, each having a plane surface, one of said sides terminating at the lingual wall of said body and the other at the buccal wall, a pinhole extending into said body inwardly from one of the sides of said recess with its axis parallel to the other of said sides and a slot extending into said body solely from said other side.

3. An interchangeable artificial anterior tooth comprising an all-ceramic body having therein a recess with two angularly disposed, meeting sides, each having a plane surface, one of said sides terminating at the lingual wall of said body and the other at the incisal edge, a pinhole extending into said body from one of the sides of said recess with its axis parallel to the other of said sides and a slot extending into said body solely from said other side.

4. An interchangeable facing having therein a recess with two faces, a pinhole extending from one of said faces into the body of said facing with its axis parallel to the other face, and a slot extending into said body solely from said other face.

5. In combination with an interchangeable facing having an angular recess therein, a backing fitting said recess, openings in said facing connecting solely with said recess, inherently rigid immobile pins fixed to said backing and extending into said opening with their axes lying in planes which are substantially at right angles to each other, and cement within said openings preventing movement of said pins therein.

6. In combination, an interchangeable facing and backing comprising a body having a recess therein, said recess being angular in vertical section; said backing being adapted to fit said recess; a cylindrical pinhole extending from one face of said recess into said body, a pin partially filling said pinhole; a slot extending into said body solely from the other face of said recess; a pin on said backing engaging said slot, said slot being as long as the first mentioned pin plus the diameter of the second mentioned pin; and cement filling the portions of said pinhole and slot not occupied by said pins.

BENJAMIN A. LINCOLN.